United States Patent
Yousef

(10) Patent No.: US 10,730,588 B2
(45) Date of Patent: Aug. 4, 2020

(54) SHIP HULL ASSEMBLY FOR REDUCING WATER RESISTANCE AND IMPROVING MANEUVERABILITY

(71) Applicant: Hani Yousef, Ajman (AE)

(72) Inventor: Hani Yousef, Ajman (AE)

( * ) Notice: Subject to any disclaimer, the term of this patent is extended or adjusted under 35 U.S.C. 154(b) by 12 days.

(21) Appl. No.: 16/308,459

(22) PCT Filed: Jun. 24, 2016

(86) PCT No.: PCT/IB2016/053792
§ 371 (c)(1),
(2) Date: Dec. 8, 2018

(87) PCT Pub. No.: WO2016/116914
PCT Pub. Date: Jul. 28, 2016

(65) Prior Publication Data
US 2020/0017170 A1  Jan. 16, 2020

(51) Int. Cl.
B63B 1/40 (2006.01)
(52) U.S. Cl.
CPC ..................... B63B 1/40 (2013.01)
(58) Field of Classification Search
CPC ............... B63B 1/40; B63H 2011/043; B63H 2011/081; B63H 11/113; B63H 11/02; Y02T 70/12
USPC ...................... 114/288, 289, 290; 440/66, 68
See application file for complete search history.

(56) References Cited

U.S. PATENT DOCUMENTS

| | | | | |
|---|---|---|---|---|
| 1,023,515 A | * | 4/1912 | Graves ................... | B63H 11/08 440/38 |
| 3,412,705 A | * | 11/1968 | Nesson ..................... | B63H 5/08 440/40 |
| 3,625,176 A | * | 12/1971 | Moellering ............ | B63H 11/08 440/40 |
| 4,505,684 A | * | 3/1985 | Holden .................... | B63H 5/14 440/38 |
| 4,661,075 A | * | 4/1987 | Czerniak .................. | B63H 5/14 440/69 |
| 4,863,404 A | * | 9/1989 | Salo ........................ | B63B 39/08 440/38 |

(Continued)

FOREIGN PATENT DOCUMENTS

| | | | | |
|---|---|---|---|---|
| CN | 2306949 Y | * | 2/1999 | ............. B63H 11/02 |
| CN | 2350310 Y | * | 11/1999 | |

(Continued)

*Primary Examiner* — Anthony D Wiest

(57) ABSTRACT

There is provided a hull assembly for reducing water resistance on a ship hull and improving the maneuverability on said ship. The hull assembly is mountable on a pre-existing ship hull having a bow, and a stern. The hull assembly comprises a propeller chamber for enclosing at least one propeller positioned proximate the stern of the ship hull, and a plurality of ducts attachable to an outer surface of the ship hull. The ducts extend in a longitudinal direction from a front part of the bow to the propeller chamber. The ducts have a plurality of bow openings along the bow for the water to flow directly toward the rear part of the stern, each of the ducts comprising at least one stern opening near the propeller chamber. The propeller chamber comprises two opposed chamber sides; at least one chamber opening on each of the two opposed chamber sides; and a rear opening for each of the at least one propeller.

10 Claims, 6 Drawing Sheets

(56) References Cited

U.S. PATENT DOCUMENTS 6,309,266 B1 * 10/2001 Burke ................ B63B 1/40
　　　　　　　　　　　　　　　　　　　440/68
8,766,471 B2 * 7/2014 Orea ................ F03B 13/105
　　　　　　　　　　　　　　　　　　　290/52

FOREIGN PATENT DOCUMENTS

| CN | 102285440 A | * | 12/2011 | ............... B63B 1/40 |
| DE | 3120609 A1 | * | 12/1982 | ............... B63B 1/40 |
| DE | 3120670 A1 | * | 12/1982 | ............. B63H 11/11 |
| GB | 191122139 A | * | 8/1912 | ............... B63H 5/16 |
| GB | 420621 A | * | 12/1934 | ............... B63H 5/14 |

* cited by examiner

SHIP HULL ASSEMBLY FOR REDUCING WATER RESISTANCE AND IMPROVING MANEUVERABILITY

FIELD OF THE INVENTION

The present invention generally relates to a hull assembly, and more particularly to a hull assembly that allows reducing wave making resistance and viscous drag, and improving the maneuverability of the ship.

BACKGROUND

Ship hulls are subjected to water resistance forces that lower ship performance and increase energy consumption. Wave making resistance and viscous drag represent the most important loss of energy during ship motion.

Wave making resistance reflects the energy required to displace the water in front of the ship. This energy is transmitted to the water and creates waves along the ship path. Viscous drag is a frictional force opposed to ship motion. In order to save energy and improve ship performance, a number of solutions for reducing hull resistance forces have been developed. Some of these solutions attempt to use bulbous extensions to marginally reduce wave making resistance. Other solutions attempt to use air bubble injection to reduce viscous drag. Some solutions are based on the use of external propellers on the sides of the hull in order to use front water to propel the ship.

Other solutions consist of flowing water from the front of the ship to the rear part of the ship in order to decrease the water resistance on the ship hull. For example, WO20100037253 discloses a flow conduit that communicates a forward water intake opening with a backward water discharge opening provided at the stern or at the two sides of the hull. A water communicating pipeline can also guide water from the front part of the ship to the rear part of the ship, as described in CN2350310. A screw propeller is therefore positioned at the rear part of the ship in the water communicating pipeline. In CN102285440, the displaced water is propelled through draft tubes at the rear of the ship. In a same manner, in CN101209751, a water inlet is arranged at a bow and a water outlet is arranged at a stern such that a pipeline guides water through the front and back of a ship body. WO1992022456 discloses an external conduct mounted forward of the bow and extending to the aft of the ship. In JP2014522778 a hydrodynamic duct is attached to the bow of a ship. Water flows through the duct, wave making effects and frictional resistance are reduced. In WO1982003055, the vessel has a duct through which water flows from the bow to the stern past the main part of the hull. According to WO1982003055, part of the water flows past the vessel through a duct and is used to assist forward motion of the vessel. However, none of the above mentioned document teaches features that allow for water flow control and water pressure control at different areas of the ship hull. Moreover, these solutions fail to meet the needs of industry because they alter specific aspects of optimum hull design and produce marginal results that sometime do not compensate for the complexity of integrating such solutions in the manufacturing process.

Therefore, there currently exists a need in the industry for a ship design that can eliminate the hydrodynamic resistance of wave making and viscous drag, and improve the maneuverability and sea keeping characteristics of a ship while minimizing the operational cost and the alteration of an optimum hull design.

Furthermore, it would be desirable to have a solution for the aforementioned desirable features that can be retrofitted on existing ships.

SUMMARY

It is therefore a general object of the present invention to provide a hull assembly for reducing water resistance on a ship hull, the ship hull having a bow, and a stern, said hull assembly comprising: a propeller chamber for enclosing at least one propeller, the propeller chamber positioned proximate the stern of the ship hull, the propeller chamber comprising two opposed chamber sides; at least one chamber opening on each of the two opposed chamber sides; and a rear opening for each of the at least one propeller; and a plurality of ducts attachable to an outer surface of the ship hull, the ducts extending in a longitudinal direction from a front part of the bow to the propeller chamber, the ducts having a plurality of bow openings along the bow for the water to flow directly toward the propeller chamber, each of the ducts comprising at least one stern opening into the propeller chamber.

In an embodiment, the ducts are transversally distributed from a waterline to a baseline of the hull at the bow, said ducts going downward toward the stern and extending under a bottom of the hull from an end part of the bow to a front part of the stern, said ducts extending toward the propeller chamber at the stern. In another embodiment, a dimension of the bow openings decreases along the longitudinal direction, from the front part of the bow toward the stern and ceases at an end of a curvature of the bow. In yet another embodiment, the dimension of the bow openings decreases along the transversal direction from the waterline down toward the baseline. In a further embodiment, the dimension of the bow openings is proportional to a volume of water expected to be displaced at the position of said bow openings.

In an embodiment, the chamber opening of each of the two opposed chamber sides is closable by a plurality of vertical door assemblies. The door assemblies can have an increasing size toward the rear part of the stern. The door assemblies can further comprise vertical closing louvers and an actuating system for controlling positioning of the closing louvers. In another embodiment, the at least one stern opening of each of the ducts opens into the propeller chamber.

In a further embodiment, the at least one stern opening of each of the ducts further comprises a closing gate, said closing gate being independently closable. In an embodiment, the hull assembly further comprises a steering nozzle attached to the rear opening. The steering nozzle can be configured to bend up to 90 degrees in a horizontal direction, both clockwise and counter clockwise. The steering nozzle can further be vertically movable.

In an embodiment, the rear opening of each of the at least one propeller is circular.

In another embodiment, when the propeller chamber encloses a plurality of propellers, the hull assembly can further comprise a closing mechanism for each of the rear openings.

In a further embodiment, the hull assembly comprises a thin extension extending forwardly from a stem of the bow for preventing water pressure leakage from one side of the bow to the other.

In another embodiment, the hull assembly comprises a plate attached horizontally along a keel of the hull for preventing an expected squat of the bow due to the low pressure created by the suction of water at said bow, and also for dampening vertical oscillation of the ship.

In an embodiment, the hull assembly is mountable on a pre-existing ship hull.

In another embodiment, the hull assembly comprises at least one water intake opening extending transversally along the width of the bottom of the hull assembly and communicating with the propeller chamber, the water intake opening being configurable between an open and a closed configuration, wherein, in the open configuration, external water flow along the bottom of the hull assembly feeds into the propeller chamber, and in the closed configuration, external water flow along the bottom of the hull assembly is circulated around and does not enter the propeller chamber.

In another embodiment of the present invention, the steering nozzle comprises a plurality of collapsible segments configurable between a collapsed configuration and an expanded configuration, wherein, in the collapsed configuration, the steering nozzle is coaxial with the rear opening and, in the expanded configuration, one side of the steering nozzle is pushed out more than an opposite side, thereby bending flow exiting from the rear opening.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

In addition, although the optional configurations as illustrated in the accompanying drawings comprise various components and although the optional configurations of the ship hull as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and co-operations thereinbetween, as well as other suitable geometrical configurations may be used for the ship hull, and corresponding parts, as briefly explained and as can be easily inferred herefrom, without departing from the scope of the disclosure.

Figure 1:
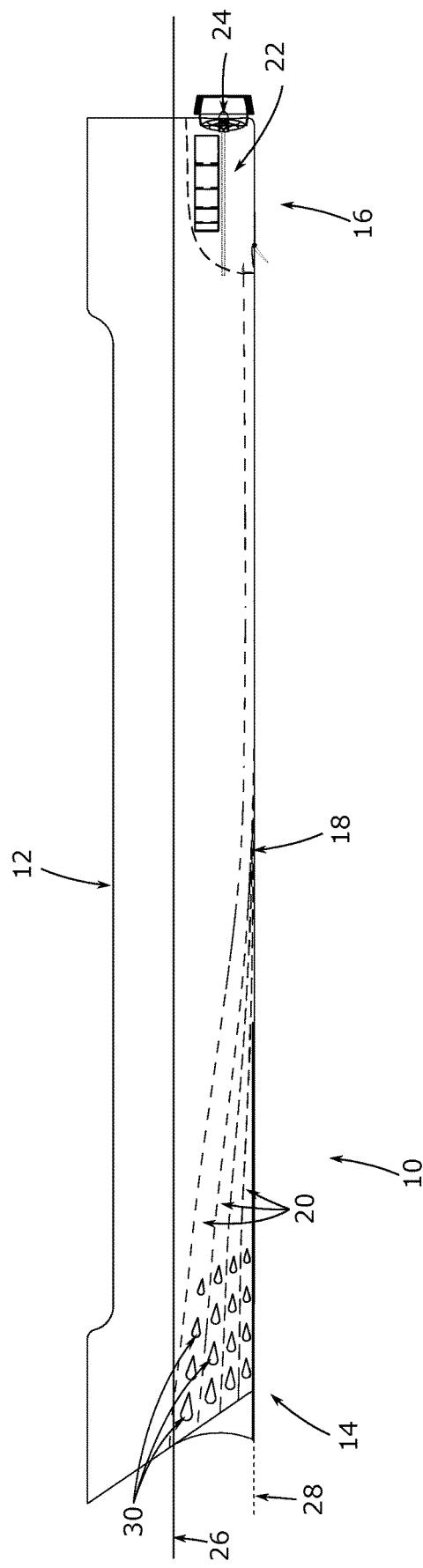
FIG. 1 is a side view of the hull assembly according to an embodiment of the present invention.

Referring to FIG. 1, according to a first embodiment of the present invention, there is shown a hull assembly 10 for reducing water resistance on a ship hull 12 and improving the maneuverability of the ship. The ship hull 12 comprises a bow 14 on a front region, a stern 16 on the rear region, a keel 18 on a bottom region, an outer surface, and two sides. The hull assembly 10 comprises a plurality of ducts 20, thereafter referred to as "the ducts", attached to an outer surface of the ship hull 12, and a propeller chamber 22 for enclosing at least one propeller 24.

In some embodiments, the ducts 20 extend longitudinally from the front part to the rear part of the ship, and more particularly from a front part of the bow 14 to a rear part of the stern 16. At the bow 14, the ducts 20 are transversally distributed from the waterline 26, where the hull meets the surface of the water, to the baseline 28 corresponding to the lowest part of the bottom region. The ducts 20 can cover the entire hull area below the waterline, but can also cover any sub-part of this area as known by the person skilled in the art. Flowing water from the front of the bow 14 to the rear of the stern 16 produces a pressure gradient between the bow 14 and the stern 16, as the water pressure at the bow 14 is decreased.

The ducts 20 comprise a plurality of bow openings 30 along the bow 14 thereby allowing the water to enter the ducts 20. The duct can be perforated on the region extended from the front part of the bow 14 to the beam region, which is the widest point of the hull measured at the waterline. As the bow 14 is the front part of the ship that enters and displaces the water in front of the ship when the ship is in motion, water pressure on the hull ahead of the bow 14 represents a considerable resistance to the ship motion.

The bow openings 30 allow for the water on the front part of the ship to flow directly toward the rear of the ship. The flowing water is not displaced by the hull and the water pressure applied on the hull is reduced, thereby reducing wave making resistance. Each of the bow openings 30 has a dimension that can vary in function of the bow opening position. In some embodiments, the dimension of the bow openings 30 decreases along the transversal direction from the waterline downward to the baseline. The dimension of the bow opening is therefore larger near the waterline where a larger amount of water is expected to be displaced. In some other embodiments, the dimension of the bow openings 30 is predetermined and is proportional to the amount of water that is expected to be displaced by the hull at the position of said bow opening. As a larger amount of water is displaced near the waterline than near the baseline, the dimension generally decreases downwardly to the baseline. In some embodiments, the dimension of the bow openings 30 decreases along the longitudinal direction from the front part of the bow 14 (or stem) to the beam, as defined previously. Indeed, due to the curvature of the bow 14, the water pressure applied on the stem of the bow 14 is larger than the water pressure applied on the beam, where the outer surface of the ship hull 12 is substantially tangential to the motion of the ship heading straightforward.

The dimension of the bow openings 30 can further be proportional to the expected water pressure due to the expected water displacement. The person skilled in the art will understand that the decrease of the dimension of the bow openings 30 in the longitudinal direction can be coupled with the decrease of the dimension of the bow openings 30 in the transversal direction. Each of the ducts 20 comprises at least one stern opening (not shown) through which the water, which has entered by the bow openings 30, comes out. The ship hull 12 can therefore comprise as many stern openings as ducts 20. The stern openings are preferably located near the propeller chamber 22 where at least one propeller 24 is enclosed. The propeller chamber 22 is therefore fed with the water coming from the front of the ship. Expelling water from the stern openings increases the water pressure applied at the stern 16 of the ship. As the water coming out from the stern openings has been removed from the bow 14 a pressure gradient is created, the resistance of the ship hull 12 is decreased and the speed of the hull increases for a same amount of consumed energy. Each of the stern openings can comprise a closing gate (not shown), which can be closable singularly and independently from the closing gate of the remaining stern openings. The closing gates allow for controlling the amount of water being sucked through the ducts 20 into the propeller chamber and therefore the water pressure applied to the bow 14 and the stern 16 of the ship hull 12. The closing gates can also be closed singularly and independently in order to be able to close a duct that would rise above the waterline, when the ship is not loaded for example. Indeed, in case a duct rises above the waterline, air is drawn in by the low pressure in the propeller chamber and the pressure applied to the stern 16 of the ship decreases, thereby decreasing the pressure gradient, hindering the ship motion, lowering the ship speed and/or increasing the energy consumption. The closing gates can also be closed partially on one side of the hull or the other, meaning that a portion of the closing gates are closed while the rest is opened on one side of the ship hull 12. For example, if a portion of the closing gates is closed on the right side, the water suction at the left side will be higher than at the right side, and the water pressure on the front left side is lower than at the front right side.

The ship thereby tends to turn or shift toward the left side.

Figure 2:
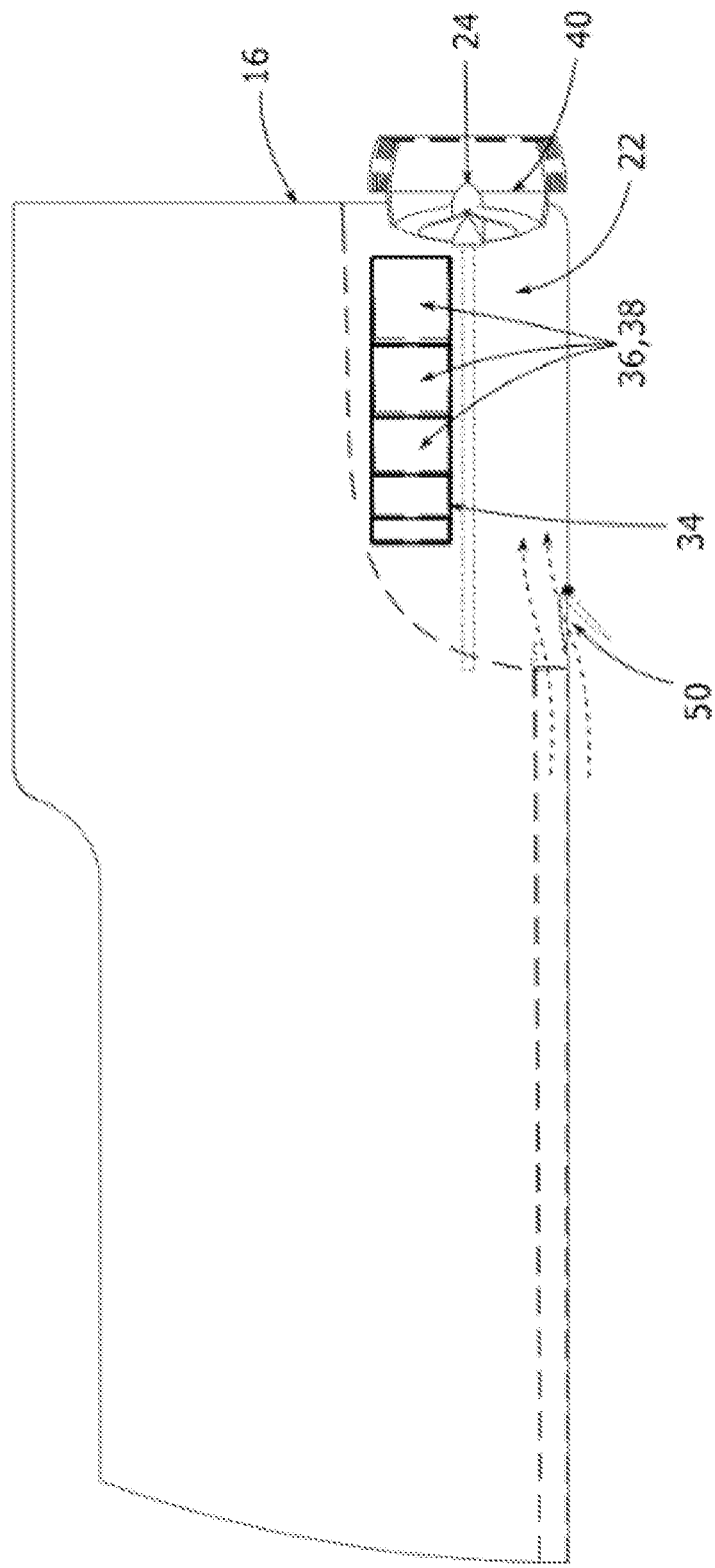
FIG. 2 is a side view of the propeller chamber located according to an embodiment of the present invention.

Now referring to FIG. 2, in some embodiments, the hull assembly 10 also comprises a propeller chamber 22. The propeller chamber 22 encloses one propeller 24 in case of a single screw ship, but can further enclose more than one propeller 24, i.e. a plurality of propellers 24. It can enclose two propellers 24 in case of a dual screw ship for example. The propeller chamber 22 is defined within the stern 16 by the right and left side of the ship hull 12, the bottom of the ship hull 12 and the rear part of the stern 16. Such parts of the ship can be extended to form the chamber and enclose the at least one propeller 24. Therefore, the sides of the hull correspond to the sides of the propeller chamber 22 along the stern 16. In some embodiments, chamber openings 34 are provided to the propeller chamber 22. More specifically, the propeller chamber 22 comprises at least one chamber opening 34 on each of the right and left sides of the propeller chamber 22. Water on the outer side of the hull can directly enter the propeller chamber 22 through the chamber openings 34. Each of the chamber openings 34 is singularly, independently and partially closable, thereby allowing for the control of the amount of water entering on each opposed side of the propeller chamber 22.

In some embodiments, the chamber openings 34 are closable by a plurality of vertical door assemblies 36. Such door assemblies 36 can have an increasing size toward the rear part of the stern 16, in order to allow a gradual increasing amount of flow into the propeller chamber along a length of the vessel towards the stern, and such that the larger downstream door assemblies are able to redirect flow that has not already been redirected by the smaller upstream door assemblies. In some preferred embodiments, the door assemblies 36 comprise vertical closing louvers 38. The vertical louvers 38 can therefore have an increasing size towards the rear part of the stern 16.

In some embodiments, the door assemblies 36 also comprise an actuating system for controlling the positioning of the vertical closing louvers 38. The vertical closing louvers 38 can thereby be closed partially, at a predetermined angle, allowing for the control of the amount of water entering the propeller chamber 22. It is understood that the door assemblies 36 can comprise any closing mechanism and/or controlling mechanism known by the person skilled in the art. The chamber openings 34 and door assemblies 36 help minimize the formation of a thick boundary layer on the side of the hull and therefore reduces the effect of viscous drag, in addition to a maneuvering capability they provide.

The propeller chamber 22 also comprises a rear opening 40 for each of the at least one propeller 24 enclosed therein. Each of the rear openings 40 is singularly and independently closable by a closing mechanism, thereby allowing restricting water propulsion or water suction from one of the propellers 24 only. Lateral maneuvers of the ship can be induced by opening only one of the rear openings 40 and closing the rest.

In a preferred embodiment the rear opening is circular, but the person in the art will understand that it can be of any other suitable shape and/or size.

Figure 4A:
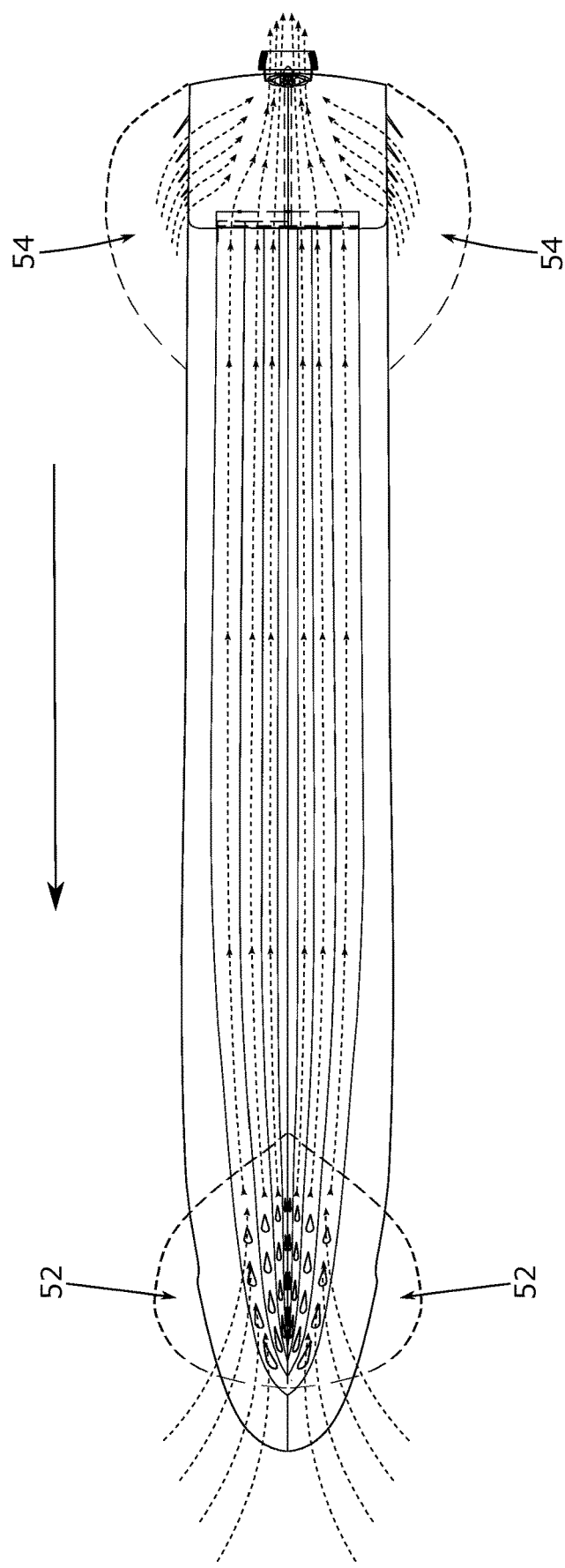
FIGS. 4A and 4B are top views of the hull assembly according to an embodiment of the present invention in different operational modes.
Figure 4B:
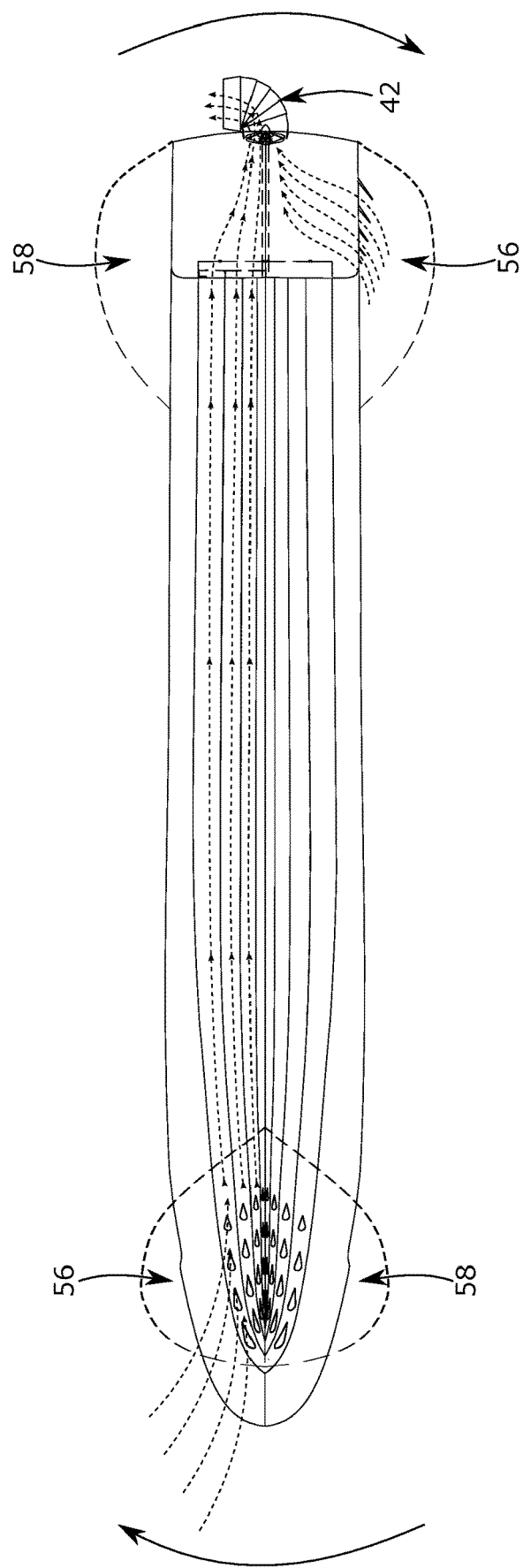

In some embodiments, referring to FIG. 4B, the ship comprises a steering nozzle 42 at the rear part of the stern 16, in place of a rudder. The steering nozzle 42 can be moved using at least on actuator, thereby enabling lateral movements of the ship. Such steering nozzle 42 can comprise a duct bendable up to 90 degree toward both right and left sides of the ship hull 12.

In some embodiments, the steering nozzle 42 comprises a plurality of pipe segments adjustable and rotatable as a group with respect to each other. The pipe segments can be fitted with one or more actuators that allow moving the steering nozzle 42 and laterally maneuvering the ship. The steering nozzle 42 can be mounted to or extend from the rear opening of the propeller chamber 22, and has therefore a dimension and a shape corresponding to the dimension and the shape of said rear opening. In some embodiment, the steering nozzle 42 comprises a circular bendable duct. However, it is understood by the person skilled in the art that such a steering nozzle 42 can have any suitable shape and/or size. In some embodiments, the steering nozzle 42 is vertically movable and acts as a trim to change the angle of the water propulsion and help the ship raise, or otherwise lower the stern. Other additional features can be added to the hull assembly 10. For example, referring to FIGS. 3 and 5, in some embodiments, a thin extension 44 (or a stem fin) can extend forwardly from the front part of the bow 14, i.e. the stem. This thin extension 44 at the front of the ship allows segregating the water pressure applied to the right side and the left side of the ship's bow. Pressure leakages from one side to the other side of the bow 14 are minimized by the extension 44. The extension 44 will maximise the benefit of the pressure difference induced by the suction when there is a need to steer the front of the ship in a specific direction. Without the extension 44, the water from the high pressure side will simply circumvent around the stem and feed the low pressure side which will cancel the benefit.

Figure 3:
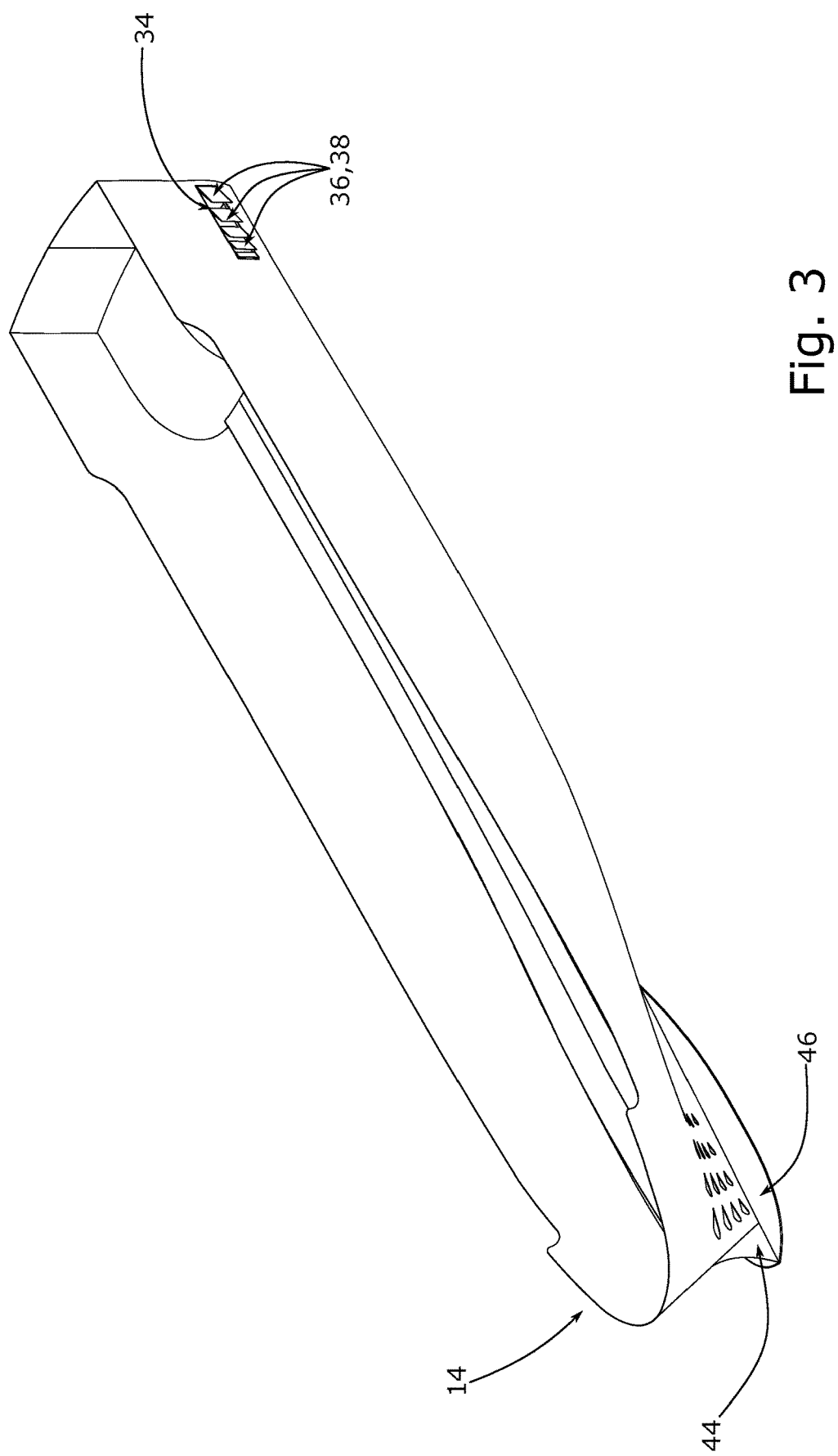
FIG. 3 is a perspective view of the bow showing a vertical extension on the front part and a horizontal plate underneath the ship hull.
Figure 5:
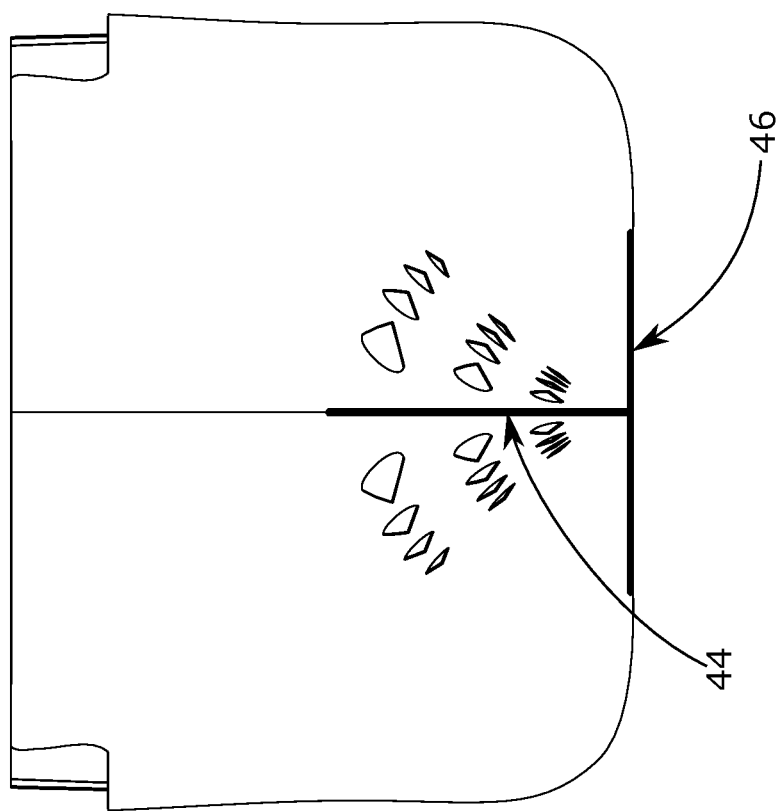
FIG. 5 is a front view of the bow showing a vertical extension on the front part and a horizontal plate underneath the ship hull.

Still referring to FIGS. 3 and 5, a plate 46 can also be attached horizontally along the keel of the ship hull 12 can prevent a possible squat effect. The low-pressure zone at the bow, which is formed by the suction of water can induce this squat effect. The squat effect results from a lower pressure underneath the ship that is therefore pulled dangerously closer to the seabed. The horizontal plate 46 can reduce the squat effect by increasing the horizontal surface in contact with the water and therefore preventing vertical sinking of the ship's bow toward the seabed. In other words, the plate 46 creates a pressure gradient where the pressure below the plate 46 is higher than the top where the openings are located, and such that the high pressure below the plate 46 will push the front up and prevent the squat effect. Vertical oscillations of the ship are also dampened by the added mass induced by the presence of the horizontal plate 46 along the keel, and the ship is therefore stabilized during motion in rough water. In some further embodiments, as seen in FIG. 2, the hull assembly 10 can comprise at least one water intake opening 50 that extends along the bottom of the hull assembly 10. The intake opening 50 extends transversally along the width of the bottom of the hull assembly 10 and communicates with the propeller chamber 22. In an open configuration, water can flow along the bottom of the hull and feed the propeller chamber 22. The ship propulsion is therefore increased by the additional amount of water entering the propeller chamber 22. This configuration can be useful when the vessel is in operational states where less water is being fed into the propeller chamber 22 from the ducts. In a closed configuration, the water flows along the bottom of the hull but circulates around and does not enter the propeller chamber 22. Moreover, the intake opening 50 provides acceleration of the water layer at the bottom of the hull.

This acceleration minimises the formation of a thick boundary layer and therefore reduces the effect of viscous drag. The hull assembly 10 as described herein allows reducing the wave-making resistance of the ship and the viscous drag mitigation, but also improving the ship maneuverability.

In a headway cruise scenario, as illustrated in FIG. 4A, the hull assembly 10 allows reducing the wave-making resistance at cruise speed. In a stationary situation, the propeller chamber 22 is full of water, which has entered through both the chamber openings 34 and the rear openings 40. Once the propeller 24 start rotating, the water is propelled out of the propeller chamber 22 and a vacuum is created. As the stern openings communicate to the propeller chamber 22, the vacuum causes water to be drawn from the front to the rear of the hull assembly 10 through the ducts 20. The water, which is normally displaced by the hull, is drawn to the propeller chamber 22 and expelled out by the propeller 24. This creates a low pressure area 52 at the front part of the bow 14, and this reduces the wavemaking resistance responsible for slow-down of the ship and increase of energy consumption. A low pressure area 54 is also formed proximate the chamber openings 34 and door assemblies 36 when the door assemblies are opened. Upon activation of the propeller 24 and creation of vacuum in the propeller chamber 22, more water at the bow 14 flows through the ducts 20 to the stern 16. The water pressure is further decreased at the bow 14 and further increased at the stern 16, creating a high pressure area behind nozzle 42 and a large pressure gradient between the bow 14 and the stern 16. Such a pressure gradient helps increasing the speed of the ship. During deceleration, the amount of water flowing through the ducts 20 is reduced by the reduction of the propeller 24 rotational speed or the decrease of the pitch of the propeller 24 blade. The pressure gradient and therefore the ship speed is reduced. When the propeller 24 is stopped, and the thrust is reversed: the water stops flowing from the bow 14 to the stern 16 and is instead reversely propelled out from the bow openings 30. The water pressure gradient is therefore reversed, with a higher water pressure at the bow 14 and a lower water pressure at the stern 16, and the ship speed is immediately reduced, until complete stop of the ship. In a complete stop configuration of the ship, viscous drag is re- introduced due to the absence of suction from the chamber openings 34 and the intake opening 50 at the bottom. The person skilled in the art will appreciate that during such maneuvers, the movement and speed of the ship are controlled by adjusting the amount of water expelled out of any one of the stern openings, chamber openings 34 and rear openings 40, which are singularly, independently and/or partially closable. The hull assembly 10 as described herein also allows for turn, lateral shift, or even complete reversal of the ship direction. The possibility of singularly, independently and/or partially close the stern, chamber and/or rear openings results in the ability to control the amount of water being sucked in from each side of the hull, and thereby allows controlling the pressure at four pressure areas of the ship hull 12, i.e. right and left sides of the bow 14 and right and left sides of the stern 16. The control of the pressure in those four pressure areas improves the maneuverability of the ship. For example in a right turn maneuver, as illustrated in FIG. 4B, the left stern openings of the hull are partially or entirely closed inducing more water suction from the right side and more water pressure applied on the front left side of the hull. This creates a pressure difference at the bow 14, with lower pressure area 56 on the right side opposed to a higher pressure area 58 on the left side, causing the bow 14 to move to the right. At the same time the right chamber opening 34 can be closed or partially closed while the left chamber opening 34 stays open. Water suction on the left side of the stern 16 creates a pressure difference at the stern 16 opposed to the pressure difference at the bow 14. The stern 16 thereby moves to the left in a coordinated turn with the bow 14. In addition, the steering nozzle 42 can further be used for sharp turns. In the case of the right turn for example or for a complete 180 degree-rotation of the ship, the steering nozzle 42 is bent up to 90 degree toward the right side of the stern 16. In case of a complete reversal of the ship movement, the four pressure areas and the steering nozzle 42 are controlled simultaneously with deceleration or stopping of the ship. The thrust is inverted and the ship, in backward motion, is maneuvered laterally by controlling the stern 16, chamber, and rear openings 40 as well as the steering nozzle 42, in a manner similar to that of the turn maneuver. Lateral shifting of the ship while maintaining the same heading direction is also possible by lowering the pressure at the side of the required lateral shift. The stern openings and the chamber opening 34 of the side opposed to the required lateral shift are partially closed. The ship shifts in the required lateral shift without turning. For example, a right lateral movement is achieved by partially closing the left stern openings and the left chamber opening 34. In-port 180-degree turns can also be easily achieved by using the described hull assembly 10. As for the turn maneuver, low pressure is imparted at two diagonally opposed pressure areas of the ship hull 12 while high pressure is imparted to the two other opposed pressure areas of the ship hull 12. For example, for a right 180 degree rotation, low pressure is imparted to the right side of the bow 14 and the left side of the stern 16 by closing the stern openings on the left side and closing chamber opening 34 on the right side.

Opposed pressure gradient are therefore imparted to the bow 14 and the stern 16. In addition, the steering nozzle 42 is bent 90 degree to the right. The person skilled in the art will understand that the sharpness of the turn depends on the angle of the bendable steering nozzle 42 as well as on the amount of water flowing through the nozzle 42, which depends on the partial closing of the stern openings and of the chamber openings 34.

The use of the hull assembly 10 as described herein also allows for lateral pier approach and lateral pier departure. In lateral approach, the steering nozzle 42 is bent 90 degree toward the direction opposite to the pier; the stern openings and the chamber opening 34 of the side of the hull opposed to the pier ship are closed. The water pressure is therefore lower on the side facing the pier, and the bow 14 and the stern 16 can move laterally and simultaneously towards the pier. The configuration for lateral departure is the exact inverse than the configuration used for lateral pier approach. Preferably, in some implementations, for the maneuvers when the nozzle 42 is bent 90 degrees, only one propeller is used and the idle propeller is closed to prevent water from moving through its corresponding rear openings 40 and disrupting the maneuver. In another embodiment of the present invention, the steering nozzle comprises a plurality of collapsible segments configurable between a collapsed configuration and an expanded configuration, wherein, in the collapsed configuration, the steering nozzle is coaxial with the rear opening and, in the expanded configuration, one side of the steering nozzle is pushed out more than an opposite side, thereby bending flow exiting from the rear opening.

Of course, the scope of the claims should not be limited by the preferred embodiments set forth in the examples, but should be given the broadest interpretation consistent with the description as a whole. Numerous modifications could be made to the above-described embodiments without departing from the scope of the claims, as apparent to a person skilled in the art.

Furthermore, it is apparent that this invention can apply to many other uses.

The invention claimed is:

1. An add-on assembly for a ship hull to effect, by means of water suction, controlled changes in water pressure acting on the ship hull, said add-on assembly comprising:
   a propeller chamber for enclosing at least one propeller, said propeller chamber positioned proximate a stern of the ship hull, said propeller chamber comprising two opposed chamber sides, a bottom side and a rear side, at least one chamber opening on each of the two opposed chamber sides, at least one water intake opening extending transverse a width of the bottom of the propeller chamber, and a rear opening at the rear side for each of the at least one propeller;
   a plurality of ducts extending in a longitudinal direction from a front part of the bow to the propeller chamber, each of the ducts comprising a plurality of longitudinally arranged bow openings and at least one stern opening into the propeller chamber for the water to flow directly toward the propeller chamber, said bow openings decreasing in an area dimension along the longitudinal direction from the front part of the bow toward the stern and said bow openings ceasing at an end of a curvature of the bow; and
   a bow pressure retention structure comprising a thin extension extending forwardly from a stem of the bow to hinder water pressure shift from a high-pressure side to a low-pressure side, and a plate attached horizontally along a keel of the hull to prevent bow squat because of low pressure effected by water suction.

2. The add-on assembly as claimed in claim 1, wherein the ducts are distributed from a waterline to the keel of the hull at the bow, said ducts going downward toward the stern and extending under a bottom of the hull from an end part of the bow to the propeller chamber at the stern.

3. The add-on assembly as claimed in claim 1, wherein an area dimension of the bow openings decreases along the transversal direction from the waterline down toward the keel.

4. The add-on assembly as claimed in claim 1, wherein an area dimension of the bow openings is proportional to a volume of water to be displaced at a position of said bow openings.

5. The add-on assembly as claimed in claim 1, wherein the chamber opening of each of the two opposed chamber sides is closeable by a plurality of vertical door assemblies, said door assemblies having an increasing size sternward and further comprise an actuating system for controlling positioning of the said door assemblies.

6. The add-on assembly as claimed in claims 1, wherein the at least one stern opening of each of the ducts further comprises a closing gate, said closing gate being independently closable.

7. The add-on assembly as claimed in claim 1, wherein the propeller chamber further comprises a circular steering nozzle attached to the rear opening, said steering nozzle is configured to bend up to 90 degrees in a horizontal direction, both clockwise and counter-clockwise and is movable vertically.

8. The add-on assembly as claimed in claim 1, wherein the propeller chamber encloses a plurality of propellers, and further comprising a closing mechanism for each of the rear openings of said propellers.

9. The add-on assembly as claimed in claim 1, wherein said add-on assembly is mountable on a pre-existing shiphull.

10. The add-on assembly as claimed in claim 7, wherein the steering nozzle comprises a plurality of collapsible segments configurable between a collapsed configuration and an expanded configuration, wherein, in the collapsed configuration, the steering nozzle is coaxial with the rear opening and, in the expanded configuration, one side of the steering nozzle is pushed out more than an opposite side, thereby bending flow exiting from the rear opening.

* * * * *